(No Model.)
C. R. MACOMBER.
FIRE EXTINGUISHER.
No. 527,120. Patented Oct. 9, 1894.
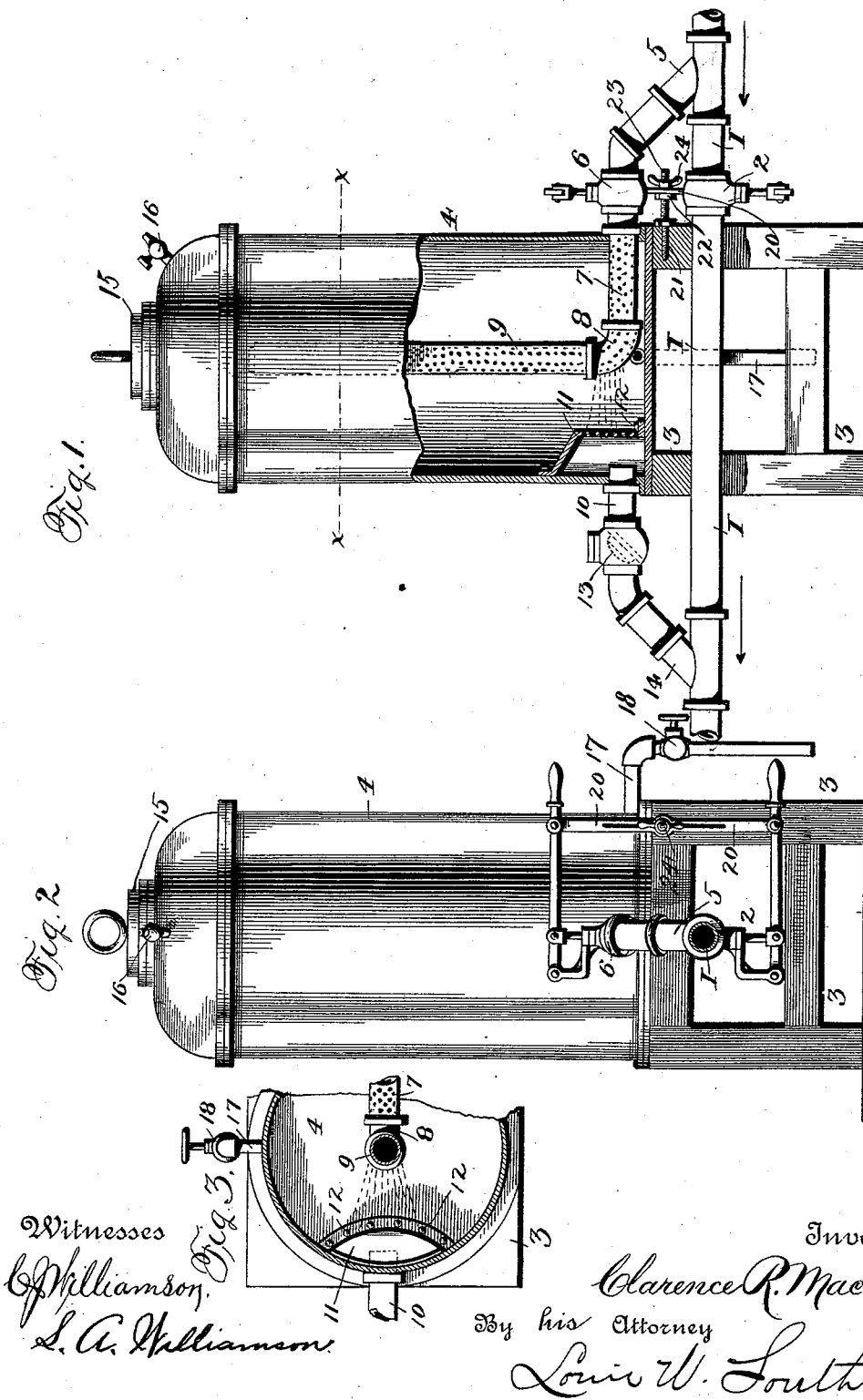
Witnesses
C. P. Williamson
L. A. Williamson
Inventor
Clarence R. Macomber
By his Attorney
Louis W. Southgate

UNITED STATES PATENT OFFICE.

CLARENCE R. MACOMBER, OF WORCESTER, MASSACHUSETTS, ASSIGNOR, BY DIRECT AND MESNE ASSIGNMENTS, TO THE MACOMBER CHEMICAL FIRE EXTINGUISHER COMPANY, OF PORTLAND, MAINE.

FIRE-EXTINGUISHER.

SPECIFICATION forming part of Letters Patent No. 527,120, dated October 9, 1894.

Application filed December 23, 1891. Renewed March 7, 1894. Serial No. 502,780. (No model.)

*To all whom it may concern:*

Be it known that I, CLARENCE R. MACOMBER, a citizen of the United States, residing at Worcester, in the county of Worcester and State of Massachusetts, have invented a new and useful Improvement in Fire-Extinguishers, of which the following is a specification.

The aim of this invention is to produce a new and improved fire extinguisher and to this end the invention consists of the device described in this specification and illustrated in the accompanying drawings, in which—

Figure 1 is a side elevation partly in section of one form of structure embodying my invention. Fig. 2 is a rear elevation, and Fig. 3 is a partial section on line x—x of Fig. 1 illustrating the arrangement of the eduction from the chemical chamber.

Briefly stated my invention consists in means for diverting part of a stream that is to be used for the purpose of extinguishing fire, causing this diverted portion to unite with a suitable chemical or chemicals and then reuniting this diverted portion with the main stream whereby the entire stream is chemicalized to the desired degree.

My invention further consists in the device which will carry out the method and which may also operate as hereinafter described.

Referring now to the said drawings in detail, 1 represents the main pipe or line which has a valve 2 therein. The pipe 1 is shown as extending under or through the frame work 3 on which is supported the mixing or chemical tank 4. On the induction side of the pipe 1 relatively to the valve 2 is fastened a Y joint 5 which connects to valve 6 and the valve 6 connects to the inside of the tank 4. Inside the tank 4, the liquid is led through the pipe 7 to the center of the tank substantially then through elbow 8 into the vertical pipe 9 which extends to near the top of the tank and preferably is plugged up at the end as shown. The pipe 7, elbow 8 and vertical pipe 9 are perforated to operate as hereinafter described.

An eduction pipe 10 leads from the tank 4 in line with the induction pipe and a suitable strainer 11 is placed over the eduction pipe and this strainer may be fastened to the tank as by screws 12. The eduction pipe 10 has a forwardly opening check-valve 13 therein and the eduction pipe 10 connects to pipe 1 by the Y joint 14. The tank 4 has a suitable removable cover 15 for the introduction of the chemical or chemicals and a pet cock 16 that may be used to let out any air or gas that may accumulate in the top of the tank.

A blow off or test pipe 17 having valve 18 leads from the bottom of the tank and by means of the same, the quality of the solution in the tank may be ascertained and also the tank may be emptied after use or whenever desired.

The valves 2 and 6 are shown as of the ordinary sliding gate pattern though of course any other form may be used and the valves are also shown as oppositely turned in the pipes relatively to each other. The operating handles of the valves may extend to the same side of the machine and where this is the case the handles are connected by the slotted rod or link 20. A suitable stud or screw 21 is set or fastened to the frame and has a collar 22 and an extending threaded portion 23 passing through the slot in the link 20 and on the same is tapped the butterfly nut 24 by means of which the link 20 and thus the valves 2 and 6 may be held in any desired adjusted position. Further it will be seen that as one valve is opened the other is closed and vice versa and the valves are so set that when one is entirely closed the other is wide open and so that when in any intermediate position the added area of the valve openings is substantially constant and is substantially equal to the entire full width opening of one valve or to the area of the pipe 1. Thus there always is a full area for the stream.

In some of my experiments I have placed a valve in pipe 1 and in place of the check valve 13 and have connected these two valves to operate with the valves 2 and 6 but I find in most instances that the second valve in pipe 1 is unnecessary and that the check valve 13 is sufficient to accomplish the function of preventing back flow into the tank and hence the construction shown is the preferred form.

The operation of my device is as follows: In case of fire, water is turned through the pipe 1 and directed by any suitable means on the fire. Now if it is desired to throw simply pure water on the fire the handles of the valves are pushed down and the valve 6 thus closed and the valve 2 opened. Then the stream simply goes through the pipe 1 and does not combine with the chemical or chemicals as the check valve 13 prevents any back flow into tank 4; but now if the fire is of such a character that it is desired to use a chemicalized liquid the handles of the valves are raised the desired degree and then as readily understood a portion of the stream is diverted and mixed with the chemicals and then mixed with the main stream.

By adjusting the valves the strength of the liquid thrown on the fire may be accurately and quickly regulated and as the valves work together only one manipulation is necessary to keep the outlet areas constant so that there will be no improper circulation.

In cases of great emergency the entire stream may be diverted through the tank 4 and thus all the chemical immediately thrown on the fire but the preferred method is to divert only part of the stream.

Of course if so desired the valves could be operated separately by disconnecting the link 20 but I find it best to have them always connected as then all that is necessary is to manipulate one handle to let chemical into the stream and by the use of any simple indicator the most unskilled man can properly work the device.

The action inside the tank is peculiar and is as follows: I preferably use chemical reagents in the form of powder and as these are apt to be of less specific gravity than water as soon as the tank is filled a portion of the powder will rise and the clear or saturated solution will be left at the bottom of the tank. The powder, being at the top or part way up the tank, will be under the action of the jets from the pipe 9 and thus the same will be quickly cut up and dissolved and mixed with the water. This action would not take place nearly as well if the jets were only admitted from the bottom of the tank as in this case the moving water would only strike the bottom of the floating chemical.

The holes in the horizontal pipe 7 are useful as the jets issuing from the bottom of the same cause a sort of whirlpool at the bottom of the tank and will thus thoroughly mix the solution before the same passes out through the eduction pipe.

Parts of the jets from the elbow 8 are directed so as to strike against the strainer 11 and the action of the same will break up any lumps of dirt that may accumulate to choke the same and thus keep the strainer free. This is an important point and adds greatly to the efficiency of the device.

My device may be made of course of any desired shape and size and may be made portable so as to be carried to fires and attached to the hydrant or source of water supply or my device may be made as a fixture and set at any desired point in the house, shop or on ship-board so that if called into service it will stand connected to the fire hose and ready for instant use. Another point that I wish to have noted is that by diverting only the desired quantity of water necessary to dissolve and introduce the chemical and by not passing the whole stream through the chemical chamber the friction of the stream through the device will be immaterial and hence the volume and force of the stream will not be decreased. I have also noticed that when the chemical is introduced in this manner the stream is actually thrown farther than when pure water is used and this I explain by supposing that the chemical introduced in this manner acts to some extent as a lubricant and therefore decreases the friction. Therefore it is very advantageous to leave the main stream undisturbed and deflect only a small portion of the same for the purpose of introducing the chemical. Practical tests have demonstrated that my device will effect these results and that the issuing stream will most quickly extinguish fire.

While I prefer to use a chemical or chemicals that will not unite with the water or with each other to give off a gas, I may of course use such or any kind of chemicals in my device that will act to extinguish fire.

Modifications of my device may be made by a skilled mechanic without departing from the scope of my invention.

Having thus fully described my invention, what I claim, and desire to secure by Letters Patent, is—

1. The combination of a pipe line and inclosed chamber, containing the chemical, induction and eduction pipes leading from said main pipe, and connected with said chamber, said induction and eduction pipes being of the same size as the main pipe line, and a suitable valve or valves arranged so that any portion, or the whole of the main stream may be diverted through the chemical chamber, substantially as described.

2. The combination of a pipe line, a closed chamber containing chemical, branch induction and eduction pipes leading from said main pipe line and connected to said chamber and valves in the branch induction pipe and in the main pipe line and connections between said valves arranged so that the valves will be oppositely operated, so that any portion of the main stream may be diverted through the tank, substantially as described.

3. The combination of a pipe line, a closed chamber containing chemical, branch induction and eduction pipes leading from said main pipe and connected to said chamber, a forwardly opening check valve located in the branch eduction pipe and valves in the branch induction pipe and in the main pipe line and connections between said valves arranged so that the valves will be oppositely operated and so that the added area of the openings of both valves will remain constant whereby any portion of the main stream may be diverted through the tank, substantially as described.

4. The combination of pipe 1, the chamber 4, the induction and eduction pipes leading from the main pipe to said chamber, the valves located in the branch induction pipe and in the main pipe, a connection as a link or rod between said valves connected so that one valve will be opened as the other is closed and means for holding the said valves in their adjusted positions, substantially as described.

5. In a fire extinguisher, a chemical tank having an induction and an eduction pipe, a strainer over the mouth of said eduction pipe and an outlet arranged in the induction pipe so as to direct a stream or jet against the face of said strainer whereby the same will be kept clear, substantially as described.

6. In a fire extinguisher, a chemical tank having induction and eduction pipes connected to the bottom thereof, said induction pipe being carried to the inside of said tank and a vertical perforated pipe connected to said induction pipe and extending to near the top of the tank, substantially as described.

7. In a fire extinguisher, a chemical tank having an induction and an eduction pipe connected to the bottom thereof, said induction pipe being carried to substantially the center of the tank as by pipe 7 and the vertical pipe 9 to which the pipe 7 is connected, said pipes 7 and 9 being perforated for the purpose set forth, substantially as described.

In testimony whereof I have hereunto set my hand in the presence of two subscribing witnesses.

CLARENCE R. MACOMBER.

Witnesses:
W. H. RAYMENTON,
LOUIS W. SOUTHGATE.